(12) United States Patent
Mäker et al.

(10) Patent No.: US 10,435,609 B2
(45) Date of Patent: Oct. 8, 2019

(54) HYDROPHILIC ETHER CARBOXYLIC ACIDS AS LUBRICANT FOR SALT BASED DRILLING SYSTEMS

(71) Applicant: EMERY OLEOCHEMICALS GMBH, Düsseldorf (DE)

(72) Inventors: Diana Mäker, Mettmann (DE); Heinz Müller, Monheim (DE)

(73) Assignee: Emery Oleochemicals GmbH, Düsseldorf (DE)

( * ) Notice: Subject to any disclaimer, the term of this patent is extended or adjusted under 35 U.S.C. 154(b) by 55 days.

(21) Appl. No.: 15/533,698

(22) PCT Filed: Jan. 7, 2015

(86) PCT No.: PCT/EP2015/050165
§ 371 (c)(1),
(2) Date: Jun. 7, 2017

(87) PCT Pub. No.: WO2016/110323
PCT Pub. Date: Jul. 14, 2016

(65) Prior Publication Data
US 2017/0335164 A1   Nov. 23, 2017

(51) Int. Cl.
*C09K 8/12* (2006.01)
*C09K 8/035* (2006.01)

(52) U.S. Cl.
CPC ............ *C09K 8/12* (2013.01); *C09K 8/035* (2013.01); *C09K 2208/34* (2013.01)

(58) Field of Classification Search
CPC ....... C09K 8/035; C09K 8/12; C09K 2208/34
See application file for complete search history.

(56) References Cited

U.S. PATENT DOCUMENTS

| | | |
|---|---|---|
| 5,106,516 A | 4/1992 | Mueller et al. |
| 5,194,422 A | 3/1993 | Mueller et al. |
| 5,252,554 A | 10/1993 | Mueller et al. |
| 5,254,531 A | 10/1993 | Mueller et al. |
| 5,318,954 A | 6/1994 | Mueller et al. |
| 5,318,956 A | 6/1994 | Mueller et al. |
| 5,348,938 A | 9/1994 | Mueller et al. |
| 5,403,822 A | 4/1995 | Mueller et al. |
| 5,441,927 A | 8/1995 | Mueller et al. |

(Continued)

FOREIGN PATENT DOCUMENTS

| | | |
|---|---|---|
| CN | 103540297 A | 1/2014 |
| CN | 103772698 A | 5/2014 |

(Continued)

OTHER PUBLICATIONS

International Search Report dated Sep. 23, 2015 in PCT/EP2015/050165 (4 pages).

(Continued)

*Primary Examiner* — Frances Tischler
(74) *Attorney, Agent, or Firm* — Philip P. McCann; Nexsen Pruet PLLC

(57) ABSTRACT

The present invention relates to a composition comprising (i) at least 10 wt % of an inorganic and/or organic, water soluble salt, based on the total weight of the composition; (ii) water; and (iii) an ether monocarboxylic acid. Further aspects of the invention relate to the use of an ether monocarboxylic acid of the invention, an amide, a salt or an ester thereof as a lubricant preferably in salt based drilling systems.

12 Claims, 1 Drawing Sheet

(56) References Cited

U.S. PATENT DOCUMENTS

| | | |
|---|---|---|
| 5,461,028 A | 10/1995 | Mueller et al. |
| 5,663,122 A | 9/1997 | Mueller et al. |
| 5,755,892 A | 5/1998 | Herold et al. |
| 5,846,601 A | 12/1998 | Ritter et al. |
| RE36,066 E | 1/1999 | Mueller et al. |
| 5,869,434 A | 2/1999 | Mueller et al. |
| 6,022,833 A | 2/2000 | Mueller et al. |
| 6,122,860 A | 9/2000 | Von Tapavicza et al. |
| 6,165,946 A | 12/2000 | Mueller et al. |
| 6,289,989 B1 | 9/2001 | Mueller et al. |
| 6,350,788 B1 | 2/2002 | Herold et al. |
| 6,482,777 B2 | 11/2002 | Cain |
| 6,716,799 B1 | 4/2004 | Mueller et al. |
| 6,806,235 B1 | 10/2004 | Mueller et al. |
| 7,666,820 B2 | 2/2010 | Mueller et al. |
| 7,741,248 B2 | 6/2010 | Mueller et al. |
| 7,959,743 B2 | 6/2011 | Mueller et al. |
| 8,148,305 B2 | 4/2012 | Westfechtel et al. |
| 8,153,562 B2 | 4/2012 | Muller |
| 8,193,125 B2 | 6/2012 | Muller et al. |
| 8,236,735 B2 | 8/2012 | Maker et al. |
| 9,085,524 B2 | 7/2015 | Muller et al. |
| 2007/0219097 A1 | 9/2007 | Mueller et al. |
| 2010/0016180 A1 | 1/2010 | Scoggins et al. |
| 2010/0258307 A1 | 10/2010 | Muller et al. |
| 2010/0294501 A1 | 11/2010 | Daute et al. |
| 2014/0048258 A1 | 2/2014 | Muller et al. |
| 2015/0210914 A1 | 7/2015 | Müller et al. |
| 2016/0230069 A1 | 8/2016 | Mäker et al. |

FOREIGN PATENT DOCUMENTS

| | | |
|---|---|---|
| DE | 102005060459 A1 | 6/2007 |
| WO | 2005012455 A1 | 2/2005 |
| WO | 2007068404 A1 | 6/2007 |
| WO | 2014015911 A1 | 1/2014 |

OTHER PUBLICATIONS

Maker et al., U.S. Appl. No. 15/533,678, filed Jun. 7, 2017.
Written Opinion dated Dec. 13, 2016 in PCT/EP2015/050165 (6 pages).
Written Opinion dated Sep. 23, 2015 in PCT/EP2015/050165 (4 pages).

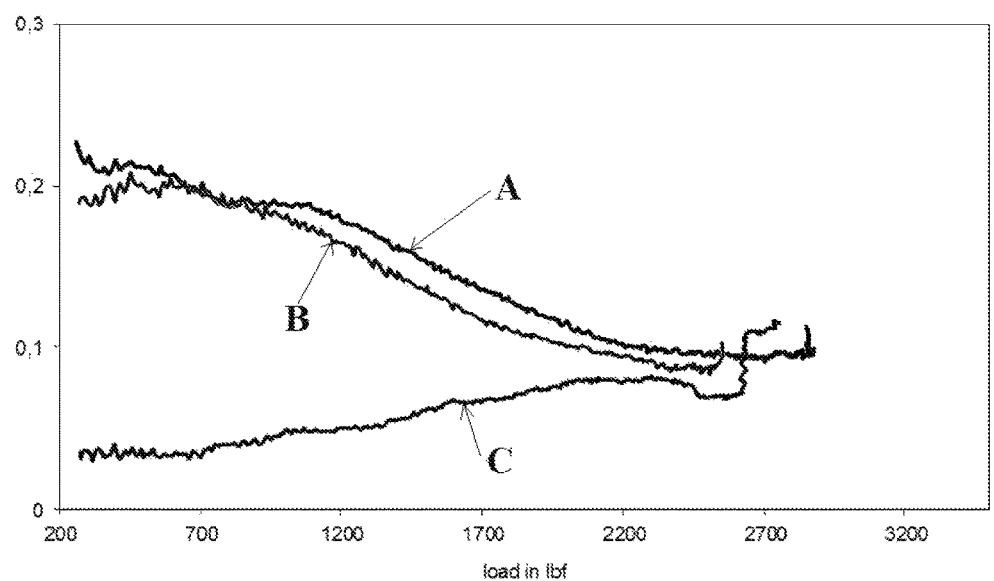

HYDROPHILIC ETHER CARBOXYLIC ACIDS AS LUBRICANT FOR SALT BASED DRILLING SYSTEMS

This application is a national stage application under 35 U.S.C. § 371 of International Application No. PCT/EP2015/050165 filed 7 Jan. 2015, the disclosure of which is expressly incorporated herein by reference.

The present invention relates to a composition comprising (i) at least 10 wt % of an inorganic and/or organic, water soluble salt, based on the total weight of the composition; (ii) water; and (iii) an ether monocarboxylic acid. Further aspects of the invention relate to the use of an ether monocarboxylic acid of the invention, an amide, a salt or an ester thereof as a lubricant preferably in salt based drilling systems.

BACKGROUND

Lubricants with improved biodegradability are desirable for example for equipment used in certain resource industries, such as forestry, mining, petroleum exploration and production, in particular wherever the lubricants themselves might come into contact with the environment.

Drilling fluids or muds are commonly circulated in the well during drilling operations in order to cool and lubricate the drilling apparatus, lift cuttings out of the wellbore and counterbalance the subterranean formation pressure encountered during drilling. An important function of a drilling fluid is to reduce the considerable torque on the rotating drill stem caused by the friction between the outside of the drill pipe comprising the drill stem and the wall of the well and/or casing strings. Drilling through offsets, deep wells and highly deviated or horizontal wells results in increased frictional forces, increasing the demand on the lubricating properties of the drilling fluids.

The oil and gas industry has used brines for well drilling and well completions for decades. High density brines have been found to be particular applicable for example in deep wells.

In particular during the operation of deep wells, as well as in extended reach and/or high angle wells, it is generally necessary for the brine-containing well treatment fluid to exhibit improved lubricity. The literature reports various additives for use as lubricating agents in drilling fluids as well as completion fluids, e.g. US 2010/016180 and DE 10 2005 060 459. Many of the reported additives are not, however, compatible with clear brines or drilling fluids or completion fluids which have brine as a major component. In addition, many additives used as lubricating agents in drilling fluids and/or completion fluids today have presented environmental concerns and tend to be costly.

Thus, a need exists for lubricating agents which may be used in brine-based drilling fluids and/or completion fluids. Such lubricating agents need to lower torque and drag by reducing metal to metal friction. Furthermore, they need to be useful in the prevention of differential sticking of downhole tubulars. Such lubricating agents further should be environmentally friendly.

It was therefore an object of the invention to provide a lubricant composition which is environmental friendly, is temperature and alkali stable and shows good solubility in brine based drilling fluids.

SUMMARY

To solve the aforementioned problems the present invention provides in a first aspect a composition comprising (a) at least 10 wt % of an inorganic and/or organic, water soluble salt, based on the total weight of the composition;
(b) water; and
(c) an ether monocarboxylic acid of the general formula (I), an amide, a salt or an ester thereof $$R-O(CH_2CH_2O)x(CH_2CHR^1O)yCH_2-COOZ \quad (I)$$

wherein
R is a saturated or unsaturated, branched or unbranched alkyl or alkenyl radical having from 6 to 22 carbon atoms;
x is an integer number of at least 5;
y is an integer number between 0 and 3;
$R^1$ is an alkyl radical having from 1 to 4 carbon atoms;
Z is a hydrogen atom or a monovalent or polyvalent cation.

Also provided is the use of an ether carboxylic acid according to the invention as a lubricant.

In preferred embodiments of the use according to the invention the ether carboxylic acid said amide, salt or ester thereof is used as a lubricant in a brine-based drilling fluid, in a completion fluid or in a workover fluid.

BRIEF DESCRIPTION OF THE DRAWING

FIG. 1 shows a comparison of the results of compositions A through C.

DETAILED DESCRIPTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Some documents are cited throughout the text of this specification. Each of the documents cited herein (including all patents, patent applications, scientific publications, manufacturer's specifications, instructions, DIN norms etc.), whether supra or infra, are hereby incorporated by reference in their entirety.

The term "water-soluble" is defined herein as a compound with a solubility in distilled water at 20° C. of at least 33 g/l. Conversely, "water-insoluble" is any compound that is not "water soluble".

The present invention provides novel compositions, in particular lubricants. It was unexpectedly found that the ether monocarboxylic acid of the invention has good lubricating properties and improved biodegradability and is particularly suitable for use in brine-based drilling fluids. Similarly, also a derivative of the ether monocarboxylic acid of the invention such as an amide, a salt or an ester thereof is expected to share these advantageous properties.

Thus, in a first aspect the invention provides a composition comprising
(a) at least 10 wt % of an inorganic and/or organic, water soluble salt, based on the total weight of the composition;

(b) water; and
(c) an ether monocarboxylic acid of the general formula (I), an amide, a salt or an ester thereof $$R\text{—}O(CH_2CH_2O)_x(CH_2CHR^1O)_yCH_2\text{—}COOZ \quad (I)$$

wherein
R is a saturated or unsaturated, branched or unbranched alkyl or alkenyl radical having from 6 to 22 carbon atoms;
x is an integer number of at least 5;
y is an integer number between 0 and 3;
$R^1$ is an alkyl radical having from 1 to 4 carbon atoms;
Z is a hydrogen atom or a monovalent or polyvalent cation.

In a preferred embodiment the composition comprises
(a) at least 15 wt % or at least 20 wt % of an inorganic and/or organic, water soluble salt, based on the total weight of the composition;
(b) water; and
(c) an ether monocarboxylic acid of the general formula (I), an amide, a salt or an ester thereof $$R\text{—}O(CH_2CH_2O)_x(CH_2CHR^1O)_yCH_2\text{—}COOZ \quad (I)$$

wherein
R is a saturated or unsaturated, branched or unbranched alkyl or alkenyl radical having from 6 to 22 carbon atoms;
x is an integer number of at least 5;
y is an integer number between 0 and 3;
$R^1$ is an alkyl radical having from 1 to 4 carbon atoms;
Z is a hydrogen atom or a monovalent or polyvalent cation.
The ester of said ether monocarboxylic acid in (c) is preferably a C1-C8 alkyl ester or a C1-C8 alkenyl ester that may be optionally substituted for example with —OH, —$NH_2$ or a halide radical (such as Cl, Br, I, or F).

Said salt of the ether monocarboxylic acid in (c) is in one embodiment preferably an amine salt of said acid. If in a preferred embodiment component (c) is an amine salt of said ether monocarboxylic acid, then said salt preferably has a structure of general formula (I) wherein Z is preferably $NH_4^+$, $NH_3R^2+$, $NH_2R^2R^3+$ or $NHR^2R^3R^4+$, wherein $R^2$, $R^3$ and $R^4$ is each individually selected from a C1-C8 alkyl or a C1-C8 alkenyl, each optionally substituted with —OH, —$NH_2$ or a halide radical (such as Cl, Br, I, or F). Alternatively, Z may also be $NH_3$, $NH_2R^2$, $NH_2R^2R^3$ or $NR^2R^3R^4$, wherein $R^2$, $R^3$ and $R^4$ is each individually selected from a C1-C8 alkyl or a C1-C8 alkenyl, each optionally substituted with —OH, —$NH_2$ or a halide radical (such as Cl, Br, I, or F). Also other salts of said ether monocarboxylic acid may be used in (c). In such embodiments, Z may for example be selected from the group consisting of sodium, lithium, potassium, caesium, calcium, magnesium and zinc.

If as component (c) an amide of said ether monocarboxylic acid of the general formula (I) is used then this amide can have a structure according to the general formula (II)

$$R\text{—}O(CH_2CH_2O)_x(CH_2CHR^1O)_yCH_2\text{—}C(O)NR'R'' \quad (II)$$

wherein R, $R^1$, x, y are as defined herein and
wherein R' and R'' is each individually selected from the group consisting of hydrogen, C1-C8 alkyl and C1-C8 alkenyl, each optionally substituted with —OH, —$NH_2$, a halide radical (such as Cl Br, I, or F), or —$OCH_3$. In one preferred embodiment of the amide, R' is —$CH_2CH_2OH$ and R'' is H. In another preferred embodiment, R' and R'' both are —$CH_2CH_2OH$.

The inorganic, water soluble salt in (a) may be selected from the group, consisting of alkali, alkaline earth salt, and a transition metal, in particular selected from the group consisting of potassium, caesium, calcium, magnesium and zinc or mixtures thereof. Preferred are the halide salts thereof, in particular chloride or bromide. In particular preferred salts are selected from the group consisting of KCl, CsCl, NaCl, $CaCl_2$, KBr and $CaBr_2$.

Preferred organic salts that can be used as component (a) are selected from the group consisting of a formiate (e.g. CsCOOH or KCOOH), oxalate, nitrate, glycolate, lactate and an acetate.

In a preferred embodiment of the composition R is a radical according to general formula (II) or (III):

$$CH_3(CH_2)_aCH\text{=}CH(CH_2)_bCH_2\text{—} \quad (II)$$

$$CH_3(CH_2)_aCH\text{=}CH(CH_2)_aCH_2\text{—} \quad (III)$$

wherein
a and b are each individually selected from an integer of between 4 and 9 and preferably of between 6 and 7.

Preferably, the ether monocarboxylic acid of the invention, amide, salt or ester thereof does not form any substantial precipitates or other solid byproducts when added to the components (a) and (b), which would tend to increase the possibility of inadvertent drill stem clogging which could ultimately also cause formation damage. In the presence of components (a) and (b) the ether monocarboxylic acid or ester thereof of the invention is preferably present in an amount of no more than about 5 wt % and more preferably less than about 2.5 wt % in solid form, i.e. non-dissolved form based on the total weight of the composition.

Preferably, the turbidity of the composition according to the invention when determined at 20° C. using the ISO 7027:1999 turbidity method to measure the attenuation of a radiant flux does not exceed the sum of 100 formazin nephelometric units (FNU) plus the turbidity of a composition solely comprising components (a) and (b) and/or wherein the composition does not comprise any precipitated material.

Preferably, the composition according to the invention is a lubricant composition and does not comprise any water-insoluble lubricant.

In a further preferred embodiment, the composition according to the invention is a lubricant composition and does not comprise any additional lubricant besides said ether monocarboxylic acid. In this context it is further preferred that the composition does not comprise as an additional lubricant any one or a combination of the following compounds:
a) carboxylic acid esters of formula (II)

$$R'\text{—}COO\text{—}R'' \quad (II)$$

wherein R' represents a saturated or unsaturated, linear or branched alkyl radical having 5 to 23 carbon atoms and R'' is an alkyl radical having 1 to 22 carbon atoms, wherein R'' may be saturated or unsaturated, linear or branched;
b) fatty acids of the general formula (III)

$$R'''\text{—}COOX \quad (III)$$

wherein R''' is a saturated, unsaturated, branched or unbranched alkyl or alkenyl radical having from 5 to 23 carbon atoms and X is a hydrogen atom or a mono- or polyvalent cation;
c) full or partial esters of glycerol with fatty acids of the above formula (III);
d) a paraffin.

In a further preferred embodiment of the composition of the invention y=0. It is also preferred that x is at least 9. In a more preferred embodiment y=0 and x=9.

It is also preferred that the composition according to the invention is not an emulsion.

Preferably, the composition according to the invention is a composition wherein R is a saturated or unsaturated C12-C22 alkyl and even more preferably wherein R is a saturated or unsaturated C14-C20 alkyl.

The amount of inorganic and/or organic salt that may be comprised in the composition of the invention will depend on the type of salt that is being used and its solubility in water. As mentioned herein it is preferred that the amount of precipitated material is kept small, for example kept below a total amount of less than about 5 wt %. Using methods to measure turbidity the skilled artisan can adjust the salt amounts such that the amount of precipitation of said salt is suitable for the respective technical use that the composition of the invention is used for. Accordingly, in preferred embodiments, component (a), i.e. the inorganic and/or organic salt, is present in an amount from at least 10 wt.-% to about 85 wt.-%, in particular, from at least about 15 wt.-% to about 30 wt.-%.

Component (b), water, is preferably present in an amount of at least about 15 wt %, or at least about 50 wt.-%, preferably at least about 70 wt.-%, in particular at least about 80 wt.-%. The amount of water will typically be used to adjust the content of said salt and ether monocarboxylic acid or ester thereof in said composition.

Component (c), the ether monocarboxylic acid or ester thereof, is preferably present in an amount of at least about 0.1 wt.-% to at least about 10 wt.-%, preferably at least about 0.15 wt.-% to about 5 wt.-%, in particular at least about 0.2 wt.-% to about 3 wt.-%.

In a further preferred embodiment the composition of the invention further comprises an additive selected from the group consisting of a viscosity modifier, a pour point depressant, a flow improver, an anti-static agent, an ashless antioxidant, an antifoam agent, a corrosion inhibitor, an anti-wear agent, a seal swell agent, an antimisting agent, a water soluble lubricant, an organic solvent, a gel-breaking surfactant and mixtures thereof.

In this context, the mentioned viscosity modifier is preferably selected from the group consisting of hydrogenated copolymers of styrene-butadiene, ethylene-propylene copolymers, polyisobutenes, hydrogenated styrene-isoprene polymers, hydrogenated isoprene polymers, polymethacrylates, polyacrylates, polyalkyl styrenes, alkenyl aryl conjugated diene copolymers, polyolefins, esters of maleic anhydride-styrene copolymers, functionalized polyolefins, ethylene-propylene copolymers functionalized with the reaction product of maleic anhydride and an amine, polymethacrylate functionalized with an amine, styrene-maleic anhydride copolymers reacted with an amine, polymethacrylate polymers, esterified polymers, esterified polymers of a vinyl aromatic monomer and an unsaturated carboxylic acid or derivative thereof, olefin copolymers, ethylene-propylene copolymer, polyisobutylene or mixtures thereof.

A water soluble lubricant may be for example an ester that is different from component (c) of the composition of the invention.

A gel breaking surfactant is preferably selected from the group consisting of glycerol monooleate, tall oil fatty acid, linoleic and stearic acids and derivatives thereof, non-ionic surfactants, and mixtures thereof.

Ashless antioxidants preferably include alkyl-substituted phenols such as 2,6-di-tertiary butyl-4-methyl phenol, phenate sulfides, phosphosulfurized terpenes, sulfurized esters, aromatic amines, diphenyl amines, alkylated diphenyl amines and hindered phenols, bis-nonylated diphenylamine, nonyl diphenylamine, octyl diphenylamine, bis-octylated diphenylamine, bis-decylated diphenylamine, decyl diphenylamine and mixtures thereof. Hindered phenols include but are not limited to 2,6-di-tert-butylphenol, 4-methyl-2,6-di-tert-butylphenol, 4-ethyl-2,6-di-tert-butylphenol, 4-propyl-2,6-di-tert-butyl phenol, 4-butyl-2,6-di-tert-butylphenol 2,6-di-tert-butylphenol, 4-pentyl-2-6-di-tert-butylphenol, 4-hexyl-2,6-di-tert-butylphenol, 4-heptyl-2,6-di-tert-butylphenol, 4-(2-ethylhexyl)-2,6-di-tert-butylphenol, 4-octyl-2,6-di-tert-butylphenol, 4-nonyl-2,6-di-tert-butylphenol, 4-decyl-2,6-di-tert-butylphenol, 4-undecyl-2,6-di-tert-butylphenol, 4-dodecyl-2,6-di-tert-butylphenol, 4-tridecyl-2,6-di-tert-butylphenol, 4-tetradecyl-2,6-di-tert-butylphenol, methylene-bridged sterically hindered phenols include but are not limited to 4,4-methylenebis(6-tert-butyl-o-cresol), 4,4-methylenebis(2-tert-amyl-o-cresol), 2,2-methylenebis(4-methyl-6-tert-butylphenol), 4,4-methylene-bis(2,6-di-tertbutylphenol) and mixtures thereof. Another example of an ashless antioxidant is a hindered, ester-substituted phenol, which can be prepared by heating a 2,6-dialkylphenol with an acrylate ester under based conditions, such as aqueous KOH. Ashless antioxidants may be used alone or in combination. The antioxidants are typically present in the range of about 0 wt % to about 95 wt %, in one embodiment in the range from about 0.01 wt % to 95 wt % and in another embodiment in the range from about 1 wt % to about 70 wt % and in another embodiment in the range from about 5 wt % to about 60 wt % based on the total weight of the lubricant composition.

Anti-wear agents include a sulfur or chlorosulphur extreme pressure (EP) agent, a chlorinated hydrocarbon EP agent, or a phosphorus EP agent, or mixtures thereof. Examples of such EP agents are amine salts of phosphorus acid, chlorinated wax, organic sulfides and polysulfides, such as benzyldisulfide, bis-(chlorobenzyl) disulfide, dibutyl tetrasulfide, sulfurized sperm oil, sulfurized methyl ester of oleic acid sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate, phosphorus esters such as the dihydrocarbon and trihydrocarbon phosphate, i.e., dibutyl phosphate, diheptyl phosphate, dicyclohexyl phosphate, pentylphenyl phosphate; dipentylphenyl phosphate, tridecyl phosphate, distearyl phosphate and polypropylene substituted phenol phosphate, metal thiocarbamates, such as zinc dioctyldithiocarbamate and barium heptylphenol diacid, such as zinc dicyclohexyl phosphorodithioate and the zinc salts of a phosphorodithioic acid combination may be used and mixtures thereof. In one embodiment the antiwear agent/extreme pressure agent comprises an amine salt of a phosphorus ester acid. The amine salt of a phosphorus ester acid includes phosphoric acid esters and salts thereof dialkyldithiophosphoric acid esters and salts thereof phosphites; and phosphorus-containing carboxylic esters, ethers, and amides; and mixtures thereof. In one embodiment the phosphorus compound further comprises a sulfur atom in the molecule. In one embodiment the amine salt of the phosphorus compound is ashless, i.e., metal-free (prior to being mixed with other components). The amines which may be suitable for use as the amine salt include primary amines, secondary amines, tertiary amines, and mixtures thereof.

Antifoam agents include organic silicones such as poly dimethyl siloxane, poly ethyl siloxane, polydiethyl siloxane, polyacrylates and polymethacrylates, trimethyl-triflouropropylmethyl siloxane and the like. An antifoam agent may be used in the range of about 0 wt % to about 20 wt %, in one embodiment in the range of about 0.02 wt % to about 10 wt % and in another embodiment in the range of 0.05 wt % to about 2.5 wt % based on the weight of the lubricant composition.

A suitable friction modifier may preferably be an organo-molybdenum compound, including molybdenum dithiocarbamate. In one embodiment, the friction modifier is a phosphate ester or salt including a monohydrocarbyl, dihydrocarbyl or a trihydrocarbyl phosphate, wherein each hydrocarbyl group is saturated. Each hydrocarbyl group may contain from about 8 to about 30, or from about 12 up to about 28, or from about 14 up to about 24, or from about 14 up to about 18 carbons atoms. In another preferred embodiment, the hydrocarbyl groups are alkyl groups. Examples of hydrocarbyl groups include tridecyl, tetradecyl, pentadecyl, hexadecyl, heptadecyl, octadecyl groups and mixtures thereof. If the friction modifier is a phosphate salt, the phosphate salt may for example be prepared by reacting an acidic phosphate ester with an amine compound or a metallic base to form an amine or a metal salt. The amines may be monoamines or polyamines. In one embodiment, the friction modifier is a phosphite and may be a monohydrocarbyl, dihydrocarbyl or a trihydrocarbyl phosphite, wherein each hydrocarbyl group is saturated. In several embodiments each hydrocarbyl group may independently contain from about 8 to about 30, or from about 12 up to about 28, or from about 14 up to about 24, or from about 14 up to about 18 carbons atoms. In one embodiment, the hydrocarbyl groups are alkyl groups. Examples of hydrocarbyl groups include tridecyl, tetradecyl, pentadecyl, hexadecyl, heptadecyl, octadecyl groups and mixtures thereof. In one embodiment, the friction modifier is a fatty imidazoline comprising fatty substituents containing from 8 to about 30, or from about 12 to about 24 carbon atoms. A suitable fatty imidazoline includes those described in U.S. Pat. No. 6,482,777. The friction modifiers can be used alone or in combination. The friction reducing agents are preferably present in the range of about 0 wt % to 60 wt %, or from about 0.25 wt % to about 40 wt %, or from about 0.5 wt % to about 10 wt % based on the total weight of the lubricant composition.

Said anti-misting agents include very high (>=100,000 Mn) polyolefins such as 1.5 Mn polyisobutylene (for example the material of the trades name Vistanex®), or polymers containing 2-(N-acrylamido), 2-methyl propane sulfonic acid (also known as AMPS®) or derivatives thereof. The anti-misting agents can be used alone or in combination. The anti-misting agents are present in the range of about 0 wt % to 10 wt %, or from about 0.25 wt % to about 10 wt %, or from about 0.5 wt % to about 2.5 wt % based on the total weight of the lubricant composition.

The corrosion inhibitors that can be used according to the invention include alkylated succinic acids and anhydrides derivatives thereof, organo phosphonates and the like. The corrosion inhibitors may be used alone or in combination. The rust inhibitors are present in the range of about 0 wt % to about 20 wt %, and in one embodiment in the range from about 0.0005 wt % to about 10 wt % and in another embodiment in the range from about 0.0025 wt % to about 2.5 wt % based on the total weight of the lubricant composition.

The flow improvers mentioned in the context of the lubricant composition of the invention include ethylene vinyl acetate copolymers and the like. The flow improvers may be used alone or in combination. The flow improvers are preferably present in the range of about 0 wt % to about 50 wt %, or from about 0.0005 wt % to about 25 wt %, or from about 0.0025 wt % to about 5 wt % based on the total weight of the lubricant composition.

The pour point depressants include alkylphenols and derivatives thereof, ethylene vinyl acetate copolymers and the like. The pour point depressant may be used alone or in combination. The pour point depressant are for example present in the range of about 0 wt % to about 50 wt %, or from about 0.0005 wt % to about 25 wt %, or from about 0.0025 wt % to about 5 wt % based on the total weight of the lubricant composition.

The seal swell agents include organo sulfur compounds such as thiophene, 3-(decyloxy)tetrahydro-1,1-dioxide, phthalates and the like. The seal swell agents may be used alone or in combination. The seal swell agents are for example present in the range of about 0 wt % to about 50 wt %, or from about 0.0005 wt % to about 25 wt %, or from about 0.0025 wt % to about 5 wt % based on the total weight of the lubricant composition.

In a preferred embodiment of the composition of the invention said ether monocarboxylic acid, amide, salt or ester thereof as defined herein is characterized by a biodegradation rate after 28 days of at least 60% $CO_2$ formation relative to the theoretical value of $CO_2$ formation as measured using a manometric respirometry test according to OECD 301 B, ISO 9439, 92/69/EEC.

In a further aspect the invention provides the use of an ether monocarboxylic acid, an amide, a salt or an ester thereof according to the invention as a lubricant.

Preferably, the ether monocarboxylic acid of the invention, amide, salt or ester thereof is used as a lubricant in a brine based drilling fluid, in a completion fluid or in a workover fluid. As used in this context "brine based" means that the drilling fluid can comprise at least 10 wt % of an inorganic and/or organic, water soluble salt such as those outlined above. Thus, in a further preferred embodiment of the use according to the invention, the brine based drilling fluid comprises at least 10 wt % inorganic and/or organic, water soluble salts, based on the total weight of the drilling fluid.

In a further preferred embodiment of the use according to the invention the ether monocarboxylic acid, amide, salt or ester thereof is used as the sole lubricant in said brine based drilling fluid.

In a further preferred embodiment, the ether monocarboxylic acid, amide, salt or ester thereof is used as lubricant in a brine based drilling fluid, in a completion fluid or in a workover fluid, wherein said brine based drilling fluid, completion fluid or workover fluid does not comprise any water-insoluble lubricants.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments.

The following examples are merely illustrative of the present invention and should not be construed to limit the scope of the invention as indicated by the appended claims in any way.

EXAMPLES

Example 1: Production of Ether Monocarboxylic Acid

In the following, a general method for producing an ether carboxylic acid of the invention is outlined.

| | | |
|---|---|---|
| Material used: | 664.0 g = 1.0 Mol | mixture of cetylalcohol + 9 EO (EO = ethoxy radicals) and oleylalcohol + 9 EO |
| | 122.3 g = 1.05 Mol | Na-monochloroacetate |
| | 44.0 g = 1.065 Mol | NaOH |
| | 364.0 g | $H_2O$ |
| | 121.2 g = 1.064 Mol | HCl 32% |
| Equipment: | a) 2 l stirring apparatus, contact thermometer having a $N_2$-connector, steam bath separating funnel | |
| | b) 1 l stirring apparatus with a distillation bridge, contact thermometer, water jet pump; funnel with filter flask | |

The ethoxylate was mixed at 45° C. with the sodium monochloroacetate and the resulting thick suspension was stirred at 45-50° C. under $N_2$ for 15 minutes. NaOH was added in four portions of 11 g each and stirred each time for 45 minutes. The temperature was thereby maintained at 50-55° C.

Next, the mixture was stirred for 3 h at 70-77° C. After the addition of hydrochloric acid the mixture was heated to 90° C. while slowly stirring the composition.

The product was transferred to a separating funnel and kept for 30 minutes over a steam bath to separate the mixture. A clear aqueous solution was separated and kept for further 15 minutes over the steam bath for a second round of separation. After removal of the remaining aqueous phase the organic phase was dried to 104° C. under water jet vacuum.

Analysis: acid value: 63.3, saponification value: 65.9, hydroxyl value: 8.7, water content: 8.7%

Example 2: Production of Test-Solutions

A 22 vol % calcium brine solution was made by dissolving 586.7 g $CaCl_2*2H_2O$ in 2 kg of distilled water.

The following brine-based drilling fluids have been prepared:

| Composition | A | B | C |
|---|---|---|---|
| 22 vol % calcium brine solution | 100 vol % | 97.5 vol % | 97.5 vol % |
| Pluronic ® RPE 1050 (block polymer of ethylene oxide and propylene oxide with a molar mass of 1950 g/mol) | 0 vol % | 2.5 vol % | 0 vol % |
| $R—O—(CH_2CH_2O)_nCH_2COOH$ wherein R = C16/C18 and n = 9 | 0 vol % | 0 vol % | 2.5 vol % |

Example 3: Testing Biological Degradability

The biodegradation rate was measured using a manometric respirometry test according to OECD 301 B, ISO 9439, 92/69/EEC. The test was performed under aerobic conditions. Respirometric BOD-determination is carried out with $CO_2$-absorption on soda lime. For the purpose of the data outlined in the following, biodegradability is expressed as the percentage $CO_2$-formation relative to the theoretical value.

The results were as follows:

| Compound | Pluronic ® RPE 1050 | $R—O—(CH_2CH_2O)_nCH_2COOH$ wherein R = C16/C18 and n = 9 |
|---|---|---|
| % $CO_2$ formation (after 28 days) | >60% | 74% |

Example 4: Determining Lubricant Quality

Lubricity was measured according to method ASTM D 3233A using a Falex pin-and-vee block tester.

Compositions A through C were tested. The results are shown in FIG. 1. According to these results the ether monocarboxylic acid of the invention in composition (C) shows unexpected and enhanced lubrication properties compared to the control (A) and a prior art additive (in composition B). At the same time the ether monocarboxylic acid of the invention showed a good biodegradability (see example above).

The invention claimed is:
1. A clear brine-based drilling fluid consisting of:
   (a) at least 10 wt % of an inorganic and/or organic, water soluble salt, based on the total weight of the clear brine-based drilling fluid;
   (b) water; and
   (c) an ether monocarboxylic acid of the general formula (I), an amide, a salt or an ester thereof as a lubricant

$$R—O(CH_2CH_2O)_x(CH_2CHR^1O)_y CH_2—COOZ \quad (I)$$

wherein R is a saturated or unsaturated, branched or unbranched alkyl or alkenyl radical having from 6 to 22 carbon atoms;
   x is an integer number of at least 5;
   y is an integer number between 0 and 3;
   $R^1$ is an alkyl radical having from 1 to 4 carbon atoms; and Z is a hydrogen atom or a monovalent or polyvalent cation;
   wherein the clear brine-based drilling fluid can be tested for turbidity and does not comprise a water-insoluble lubricant, wherein said water-insoluble lubricant is any one or a combination of the following compounds:
   a) carboxylic acid esters of formula (II)

$$R'—COO—R'' \quad (II)$$

wherein R' represents a saturated or unsaturated, linear or branched alkyl radical having 5 to 23 carbon atoms and R'' is an alkyl radical having 1 to 22 carbon atoms, wherein R'' may be saturated or unsaturated, linear or branched;
   b) fatty acids of the general formula (III)

$$R'''—COOX \quad (III)$$

wherein R''' is a saturated, unsaturated, branched or unbranched alkyl or alkenyl radical having from 5 to 23 carbon atoms and X is a hydrogen atom or a mono- or polyvalent cation; c) full or partial esters of glycerol with fatty acids of the above formula (III); and d) a paraffin wherein the clear brine-based drilling fluid has a turbidity does not exceed the sum of 100 formazin nephelometric units (FNU) plus the turbidity of a composition solely comprising components (a) and (b), wherein the turbidity was determined at 20° C. using the ISO 7027:1999 turbidity method to measure the attenuation of a radiant flux.

2. The clear brine-based drilling fluid according to claim 1, wherein R is a radical according to general formula (II) or (III):

  (II)

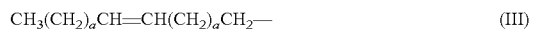  (III)

wherein a and b are each individually selected from an integer of between 4 and 9.

3. The clear brine-based drilling fluid according to claim 1, wherein the clear brine-based fluid does not comprise any precipitated material.

4. The clear brine-based drilling fluid according to claim 1, wherein the clear brine-based drilling fluid is a lubricant composition and does not comprise any water-insoluble lubricant.

5. The clear brine-based drilling fluid according to claim 1, wherein y=0.

6. The clear brine-based drilling fluid according to claim 1, wherein x is at least 9.

7. The clear brine-based drilling fluid according to claim 1, wherein y=0 and x=9.

8. The clear brine-based drilling fluid according to claim 1, wherein the clear brine-based drilling fluid is not an emulsion.

9. The clear brine-based drilling fluid according to claim 1, wherein R is a saturated or unsaturated C12-C22 alkyl.

10. The clear brine-based drilling fluid according to claim 1, wherein R is a radical according to general formula (II) or (III):

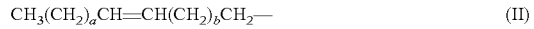  (II)

  (III)

wherein a and b are each individually selected from an integer of between 6 and 7.

11. The clear brine-based drilling fluid according to claim 2, wherein the clear brine-based fluid does not comprise any precipitated material.

12. The clear brine-based drilling fluid according to claim 2, wherein the clear brine-based drilling fluid does not comprise any water-insoluble lubricant.

* * * * *